April 22, 1930.  C. A. ANDERSON  1,755,169
PUMP OR ENGINE CONSTRUCTION
Filed Aug. 8, 1925   2 Sheets-Sheet 1

Inventor
Charles A. Anderson

April 22, 1930. C. A. ANDERSON 1,755,169
PUMP OR ENGINE CONSTRUCTION
Filed Aug. 8, 1925 2 Sheets-Sheet 2

Witnesses:
William P. Kilroy
Harry L. White

Inventor:
Charles A. Anderson

Patented Apr. 22, 1930

1,755,169

UNITED STATES PATENT OFFICE

CHARLES A. ANDERSON, OF CHICAGO, ILLINOIS

PUMP OR ENGINE CONSTRUCTION

Application filed August 8, 1925. Serial No. 49,137.

My invention relates to pump or engine construction, and more particularly to improvements in pump or engine construction, adapted for use in pressure, refrigerating systems and the like, though in its broader aspects it is not limited to the particular use or uses specified.

Among the salient objects of the invention are to provide a construction which can be used either as an engine or pump, which may be used for pumping and compressing fluids, or as a prime mover using steam vapor, gas or air pressure and the like. To provide a construction of the character referred to in which the cylinders and their pistons are rotatably mounted on a drive shaft, said pistons having operative connections or connecting rods, one end of which by a flexible or universal joint is connected to a fixed point radially removed from an extended axial line of the drive shaft. To provide a construction which when used as a pump eliminates check-valves, the inlet and outlet ports being controlled by the rotation of the cylinders.

To provide a construction, which when used as an engine, eliminates the inlet and cut-off valves because the rotation of the cylinders themselves serves as a valve member.

To provide a construction where a number of pistons and their connections use one stationary actuating bearing in common thus eliminating an objectionable number of bearings or pivots. To provide a construction where the connecting rod bearings are automatically adapted to take up any reasonable amount of wear, and enable the engine or pump to run smooth and noiseless for long periods of time without taking up lost motion. The means provided for lubricating pistons and moving parts are also novel and important. To provide a construction where the pump may be used in a closed circulation system and maintain a desired difference of pressure between two compartments, and in general to provide a construction that is simple, and compact, which is economically manufactured and yet is intensely practical and reliable in operation.

The drawings and specification show and describe the device as used in connection with a closed circulatory system, refrigerating systems and the like, the general arrangement of which would be somewhat modified when using the device as an engine or prime mover.

In the drawings—

Referring to the drawings—

Figure 1:
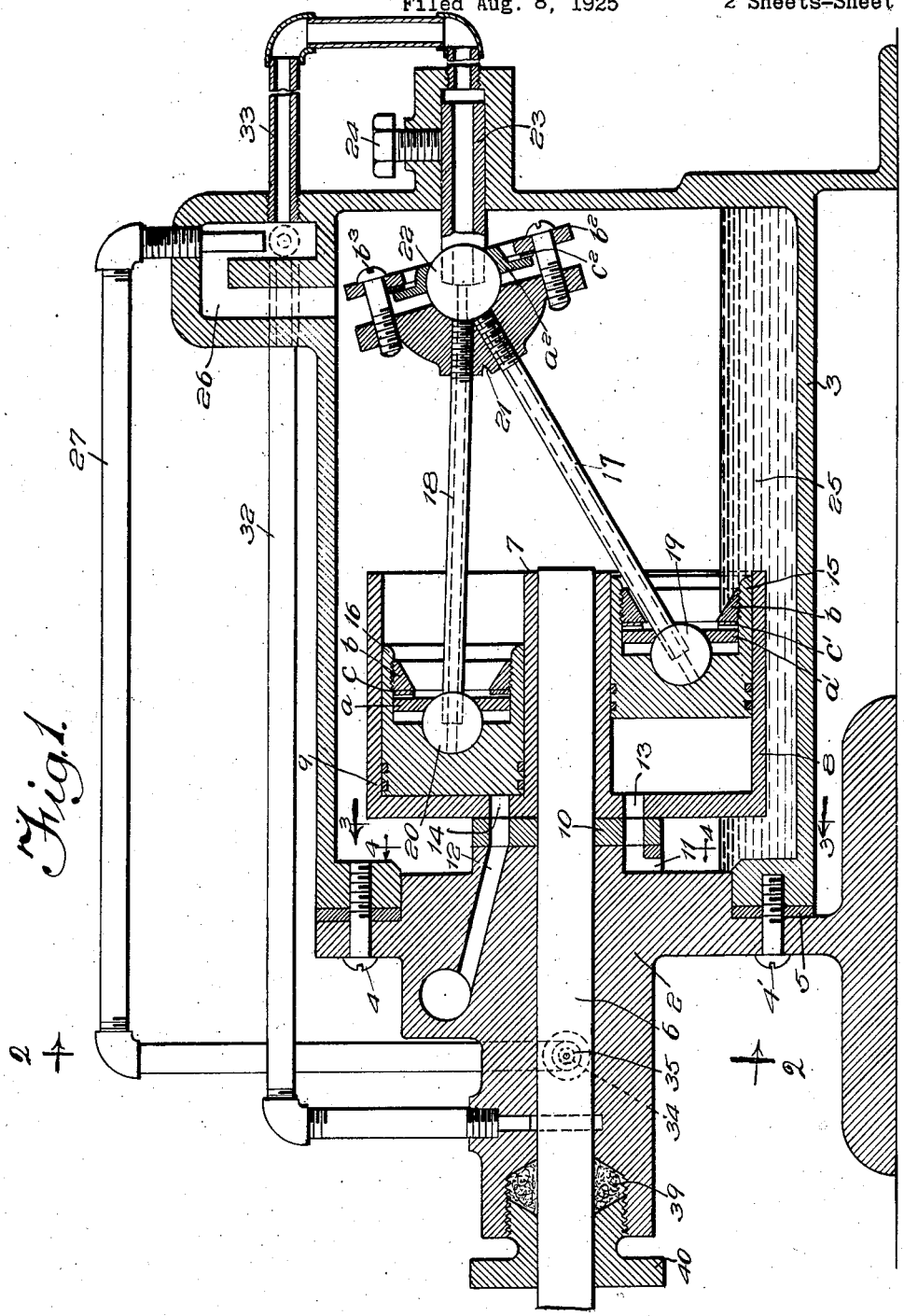
Figure 1 is vertical sectional view of my invention.
Figure 2:
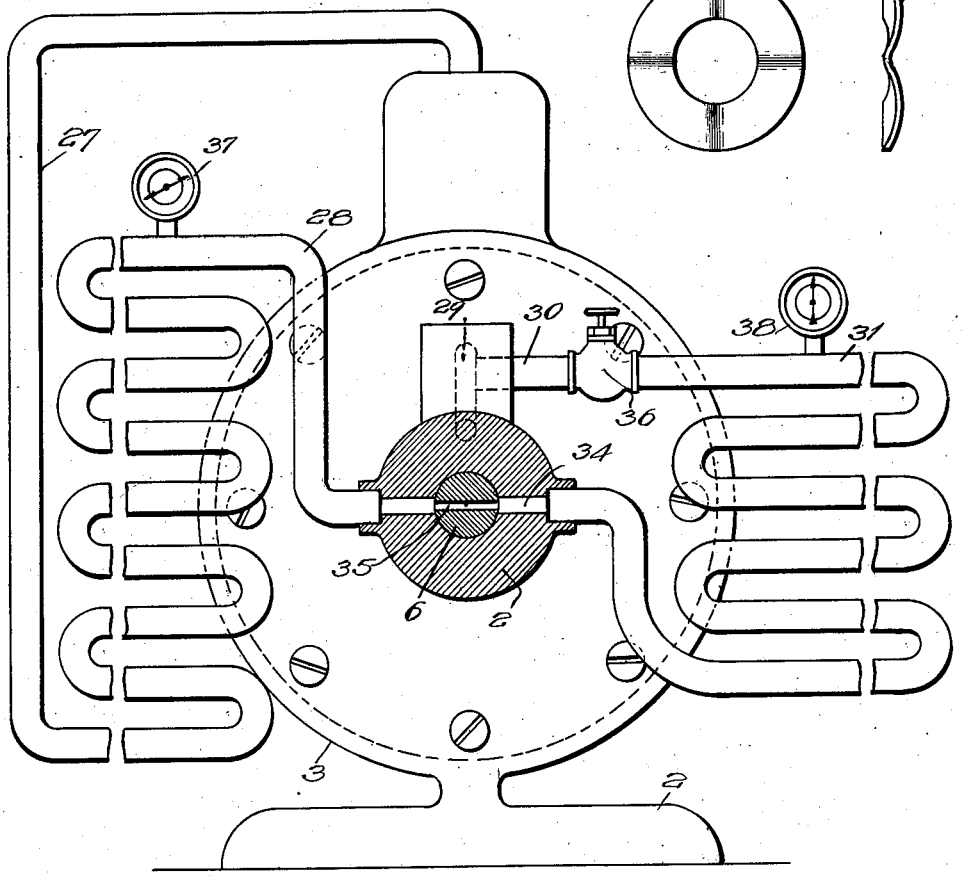
Figure 2 is a transverse view partly in section taken on line 2, Figure 1 looking in the direction of the arrow.

2 designates the stationary main bearing support having a cylindrical casing 3 secured thereto by means of screws 4 and 4'; a gasket 5 interposed between the two assures a gas-tight enclosure. Rotatably mounted in main bearing support 2 is a drive shaft 6 having at its inner end rigidly secured to itself the cylinder block 7 having the cylinders 8 and 9, the axis of which is substantially parallel with that of the shaft and equidistant thereto.

The inner end of main bearing support 2 and the opposing face of cylinder block 7 are accurately machined square with the shaft 6 and carries between them the anti-friction washer 10.

11 and 12 are the respective inlet and outlet ports in the main bearing support 2, and 13 and 14 are the respective ports in cylinder block 7, each of which communicates with its corresponding cylinder.

15 and 16 are pistons adapted to reciprocate within the cylinders 8 and 9 by means of the hollow connecting rods 17 and 18, each of which have operative connections at one of their ends to the pistons 15 and 16 by the ball and socket joints 19 and 20 and at their other end by means of their common socket 21 to the stationary ball 22, the latter of which by means of hollow extension 23 and set screw 24 is adjustably secured in the closed end of casing 3 at a point radially remote from an extended axial line of drive shaft 6.

Preferably as shown, the lower part of casing 3 is filled with a suitable amount of lubricating oil so that as the parts rotate within casing 3 they are all effectively lubricated. Inlet port 11, as shown, communicates with interior of casing 3, which in turn, by means of U shaped passage 26 communicates with inlet pipe 27 and the therewith connected low pressure coil or compartment 28; outlet port 12 by means of passage 29 communicates with outlet pipe 30 and the therewith connected high pressure coil or compartment 31. Leading from one end of U shaped passage 26 are the respective oil conveying tubes 32 and 33, and any oil which in the course of running sprays over into the high and low pressure coils, or escapes from casing 3 will by means of this oil conveying tubes be returned to bearing of main shaft 6 and by means of hollow extension 23 and hollow connecting rods 17 and 18 to their respective bearings, the function of the U shaped passage 26 is to act as an oil trap permitting the lighter fluid such as vapor or gas to enter casing 3 and the heavier oil to find its way back by gravity and centrifugal force through the above mentioned passages.

Figure 5:
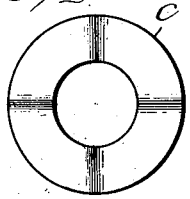
Figures 5 and 6 are views showing the spring washer used for the ball retaining caps.
Figure 6:
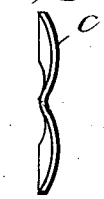
Figure 3:
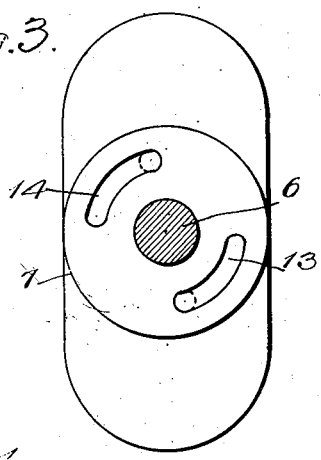
Figure 3 is a transverse view taken on line 3, Figure 1 looking in the direction of arrow, showing the cylinder ports.

Interposed between retaining caps $a$, $a'$ and $a^2$ on ball and socket joints 19, 20 and 22, and the adjusting screws $b$, $b'$, and $b^2$ and $b^3$ are the wave shaped spring washers $c$, $e'$ and $c^2$ shown in Figures 5 and 6, the function of which is to press the retaining caps $a$, $a'$ and $a^2$ up against their respective bearings and thus automatically take up any reasonable amount of wear that may take place in the joints. The main wear and pressure, it will be observed, is always when running on that side of the bearings which is opposed to the retaining caps.

Interposed between high and low pressure coils or compartments 31 and 28 is a passage 34 leading through the main bearing of shaft 6, said passage is, in practice, opened and closed in an intermittent manner by means of a port or hole 35, drilled in shaft 6. The object of this arrangement is to keep the difference of pressure in high and low pressure coils or compartments at a predetermined ratio, which ratio may also be somewhat modified by adjustment of valve 36. The object of this ported passage is to eliminate the hair-fine adjustment so hard to obtain by a restricted valve passage, where a little oil or sediment upsets the ratio of the desired pressure. It will be understood that port or hole 35 is open only a fraction of the time of the revolution of the shaft 6, and may consequently be relatively large and able to clear itself of any ordinary obstruction that may occur. 37 and 38 are gauges showing the relative high and low pressure obtained. 39 and 40 represent a stuffing box to prevent any leakage of vapor or oil past the drive shaft 6.

From the foregoing it will be understood that upon causing drive shaft and the thereto secured cylinder block 7 to rotate the pistons 15 and 16 will be caused to reciprocate within their respective cylinders and in opposite directions by reason of the angular variation thus obtained by their connecting rods relative to the fixed stationary ball 22 and the axis of their respective cylinders.

In Figure #1 the cylinders, pistons and their connections are shown in the position obtained at the completion of their respective out and in stroke, cylinder 8 and piston 15 having drawn in a full charge of the fluid to be compressed and pumped through the inlet port 11, and cylinder 9 and piston 16 having expelled its contents through outlet port 12.

Figure 4:
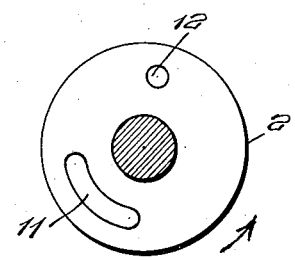
Figure 4 is a view taken on line 4, Figure 1 looking in the direction of arrow, showing inlet and outlet ports in main stationary bearing support.

By rotating shaft and cylinders, pistons and their connections in the direction shown by arrow Fig. 4, the inlet port to cylinder 8 will be closed, and after about one quarter of a revolution of the shaft, the cylinder port 13 will begin to register with outlet port 12 permitting the compressed fluid to be forced out into the high pressure coil or compartment 31 by the inwardly moving piston 15, cylinder 9, and port 14 in the meantime registers with inlet port 11 and the outwardly moving piston 16 draws in a new charge from casing 3 and the therewith connected low pressure coil or compartment 28. By continuing to rotate shaft 6 a pumping action will thus be set up by the revolving cylinders, their pistons and their connections, the respective ports in cylinders and main bearing block registering with each other at the proper time for the inlet and outlet of the fluid to be compressed, and pumped, thus eliminating obstructions, check valves or valve mechanism.

When the device is used as an engine the ports 11 and 12 will operate in the opposite way, port 12 becoming the inlet and 11 the outlet port.

It is obvious that various changes in detail of construction such as the angle of cylinders and shaft, the variable angle of the connecting rods and the longitudinal movement of the piston or pistons and other changes in construction and combination of parts can be made without departing from the scope of my invention.

I claim as my invention:

1. The combination of a main support, a drive shaft in said support having a rotary element secured thereto, ported cylinders in said element, pistons in said cylinders, hollow connecting-rods operatively connected at one of their ends to said pistons and at their other ends to a stationary point radially removed from an extended axial line of said drive shaft.

2. The combination with a main support, a drive shaft adopted to rotate in said support, a cylinder-block secured to said drive shaft, cylinders in said block the axis of which is radially removed and substantially parallel with the axis of said shaft, pistons within said cylinders and means to reciprocate same by the angular variations of their connecting rods as the cylinders rotate.

3. The combination of a main support, a drive shaft having a rotatable element secured thereto journaled in said support, ported cylinders in said element, pistons in said cylinders, connecting-rods operatively connected at one of their ends to said pistons and at their other end to a fixed center radially removed from an extended axial line of said shaft in such manner as to rotate and oscillate around said fixed center upon the rotation of said element.

4. In a mechanical movement the combination of a shaft, a rotary element on said shaft, a sliding member carried by said element, operative connections between said sliding member and a stationary point radially removed from an extended axial line of said shaft.

5. The combination of a rotary element adapted to rotate within a gas tight casing, ported cylinders in said element the axis of which are substantially parallel to the axis of their rotation, pistons in said cylinders, connecting rods operatively connected at one of their ends to said pistons and rotating therewith, and at their other end connected with and rotating around a center longitudinally remote from said cylinders and radially removed from an extended axial line of their rotation.

6. The combination of a main support, a shaft, a rotary element on said shaft, ported cylinders in said element, pistons in said cylinders, ports in said support adapted to register with said cylinders, operative connections between said pistons and a fixed point radially removed from an extended axial line of said shaft, low and high pressure compartments connected with said ports and means to rotate said element substantially as described.

7. The combination of a main support, a shaft, a rotary element on said shaft, cylinders in said element, pistons in said cylinders, connecting-rods operatively connected at one of their ends to said pistons by means of universal joints and at their other ends to a fixed point, and resilient means to compensate for the wear of said joints, substantially as described.

8. The combination with ported cylinders, of pistons for said cylinders, connecting rods for said pistons, each of said rods having one of its ends operatively connected to one of the pistons, a common bearing for the other ends of said rods, and means for causing relative angular displacement between said bearing and said cylinders to reciprocate the pistons in the cylinders, said angular displacement being in a plane disposed at an angle to the longitudinal axis of the cylinders.

9. The combination with a ported cylinder, of a piston for said cylinder, a connecting rod having one of its ends operatively connected to said piston, a bearing for the other end of said rod, and means for causing relative angular displacement between the cylinder and said bearing to reciprocate the piston in the cylinder, said angular displacement being in a plane normal to the longitudinal axis of the cylinder.

10. The combination with ported cylinders, of pistons for said cylinders, connecting rods for said pistons, each of said rods having one of its ends operatively connected to one of said pistons, a bearing member rigidly secured to the other ends of the piston rods and adapted to prevent relative displacement therebetween, and means for reciprocating said pistons by angular variation of said rods, with respect to said cylinders.

11. In a pump for compressing gaseous fluids the combination of a main support, a shaft, a rotary element on said shaft, ported cylinders in said element, pistons in said cylinders, operative connections between said pistons and a fixed point radially removed from an extended axial line of said shaft, inlet and outlet ports in said support adapted to register with the ports in said cylinders, low and high pressure compartments connected to said inlet and outlet ports, means to adjust and maintain a fixed ratio of pressure in said compartments embracing a direct passage between same, an adjusting valve and a mechanically controlled port in said passage, and means to open and close said port in an intermittent manner, substantially as described.

In testimony whereof, I have signed my name to this specification.

CHARLES A. ANDERSON.